United States Patent
Hatase et al.

(10) Patent No.: US 7,030,924 B2
(45) Date of Patent: Apr. 18, 2006

(54) IMAGE READING DEVICE AND METHOD FOR THE SAME

(75) Inventors: Takayuki Hatase, Fukuoka (JP); Masayuki Arase, Saga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 715 days.

(21) Appl. No.: 10/036,716

(22) Filed: Dec. 21, 2001

(65) Prior Publication Data

US 2002/0135676 A1    Sep. 26, 2002

(30) Foreign Application Priority Data

Dec. 25, 2000    (JP) .............................. 2000-391951

(51) Int. Cl.
    *H04N 5/335*    (2006.01)
(52) U.S. Cl. ...................... 348/324; 348/140; 382/141
(58) Field of Classification Search ................ 348/142, 348/86, 231.1, 266, 166, 288, 87, 91, 324, 348/140, 141, 145; 382/144, 145, 146, 147, 382/148, 149, 150, 151, 152

See application file for complete search history.

(56) References Cited

U.S. PATENT DOCUMENTS

| 5,003,420 A | 3/1991 | Hinlein |
| 5,262,871 A * | 11/1993 | Wilder et al. ................ 348/307 |
| 5,751,519 A | 5/1998 | Hata |
| 5,768,064 A | 6/1998 | Baasch et al. |
| 6,081,613 A * | 6/2000 | Ikurumi et al. ............. 382/147 |
| 6,445,813 B1 * | 9/2002 | Ikurumi et al. ............. 382/147 |
| 2001/0040771 A1 * | 11/2001 | Kohei et al. ............. 360/265.9 |

FOREIGN PATENT DOCUMENTS

| EP | 0 555 969 A1 | 8/1993 |
| JP | 2-1962 | 1/1990 |
| JP | 4-314258 | 11/1992 |
| JP | 7-141812 | 2/1995 |
| JP | 10-262187 | 9/1998 |
| JP | 11-232805 | 8/1999 |
| JP | 2000-100103 | 7/2000 |
| JP | 2002-125099 | 4/2002 |
| WO | WO 95/13610 | 5/1995 |

* cited by examiner

*Primary Examiner*—Ngoc-Yen Vu
*Assistant Examiner*—Nelson D. Hernandez
(74) *Attorney, Agent, or Firm*—RatnerPrestia

(57) ABSTRACT

When an image object is read using a camera including a line sensor having pixels arrayed in a line, a relative-movement-detecting section detects a movement of a transfer head holding the object in X direction relative to the camera. The detecting section outputs a movement-detecting signal to a camera-controller every time the object moves a given distance corresponding to a scanning space in X direction. The camera-controller controls a pixel-selecting circuit according to the movement-detecting signal and outputs an image signal from pixels selected based on pixel-selecting information. As a result, even if a moving mechanism of the transfer head has an error, a resolution becomes stable and an exact image is obtainable.

3 Claims, 8 Drawing Sheets

IMAGE READING DEVICE AND METHOD FOR THE SAME

FIELD OF THE INVENTION

This invention relates to an image reading device and an image reading method to read image objects with a line sensor. Particularly, it relates to a device and a method for shortening image reading time and obtaining an exact image.

BACKGROUND OF THE INVENTION

In electronic-component-mounting apparatuses, a line sensor is used as image reading means for recognizing a position of an object to be mounted by image processing. A line sensor is formed of pixels arrayed in a line and the pixels are equipped with photoelectric transfer elements storing electric charges responsive to an amount of received light. When an optical image of an object is formed on the line sensor with an optical system, electric charges are stored in each pixel corresponding to the optical image of the object. Electric charges are output as an electric signal sequentially, so that one dimensional image data in pixel array direction, namely main scanning direction, can be obtained. Components are moved relative to sub scanning direction crossing main scanning direction, so that a plurality of one-dimensional data are arranged in parallel, whereby desirable two-dimensional image data is obtained. Conventionally a charge coupled device (CCD) line sensor has been used as this line sensor discussed above.

Components to be mounted have various kinds and sizes. A multifunctional-component-mounting apparatus for various components ranging from a small size to a large size is required to read images of components in various sizes with one image reading device. For this reason, an image reading device with a line sensor is usually equipped with a line sensor of which scanning width accommodates to the largest component. An image signal from the line sensor is stored in an image memory of the image reading device.

However, when an image is read, a CCD line sensor used in a conventional image reading device is required that electric charges be transferred from every pixel of the line sensor regardless of a component size. Such a conventional method takes excess time to read image because electric charges are transferred from pixels carrying no necessary information. A relative moving speed in sub scanning direction is sometimes dispersed by a mechanical error, and resolution in sub scanning direction is also dispersed resulting from this dispersion. An exact image thus can't be obtained.

SUMMARY OF THE INVENTION

It is an object of this invention to solve the problems mentioned above by providing an image reading device and an image reading method for shortening image reading time and obtaining an exact image.

An image reading device for reading an optical image of an object using a camera having pixels arrayed in a line comprises the following elements:
- (a) a pixel-selecting section for accessing the pixels individually and outputting an image signal;
- (b) pixel-selecting-information-providing means for providing pixel-selecting information including necessary information to specify a pixel which outputs the image signal;
- (c) a relative-moving mechanism for moving the object relative to the camera;
- (d) a relative-movement detector for detecting the object moving a given distance in one direction relative to the camera; and
- (e) a controller for controlling the pixel-selecting section based on the pixel-selecting information and outputting a pixel signal supplied from a desirable pixel when the relative-movement detector detects a relative movement of the given distance.

The present invention provides an image reading method for reading an optical image of an object using a camera with pixels arrayed in a line. The image reading method comprises the following steps:
- (a) moving the object by a relative-moving device in one direction relative to a camera; and
- (b) outputting an image signal from a specific pixel repeatedly based on pixel-selecting information every time the object moves a given distance.

In this invention, even if the relative-moving device, which moves an image relative to the camera, has an error, a resolution becomes stable and an exact image is obtainable.

DETAILED DESCRIPTION OF PREFERRED EMBODIMENT

This invention will be described with reference to the accompanying drawings.

Figure 1:
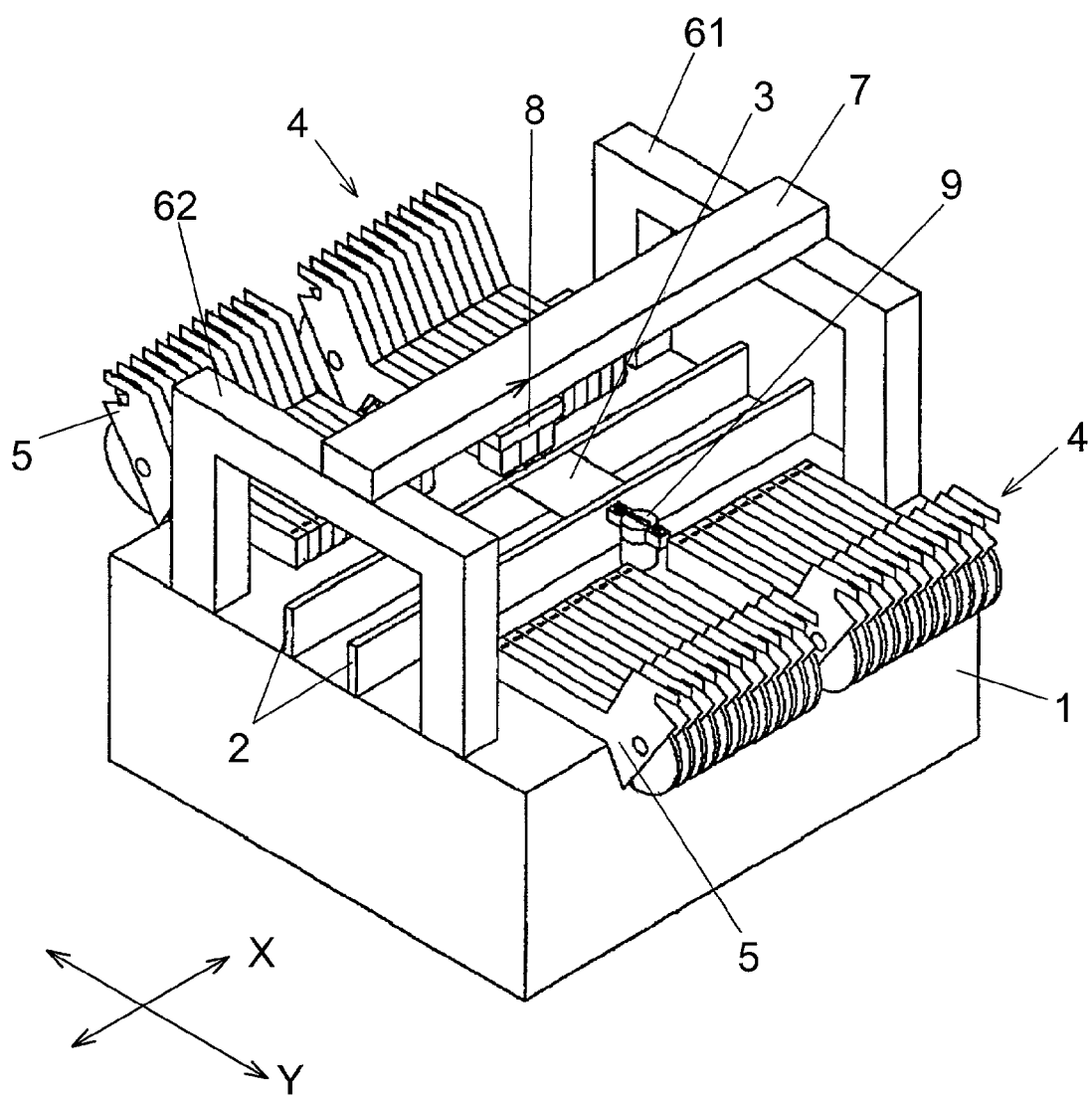
FIG. 1 is a perspective view of a component-mounting apparatus with an image reading device in accordance with an embodiment of the invention.
Figure 2:
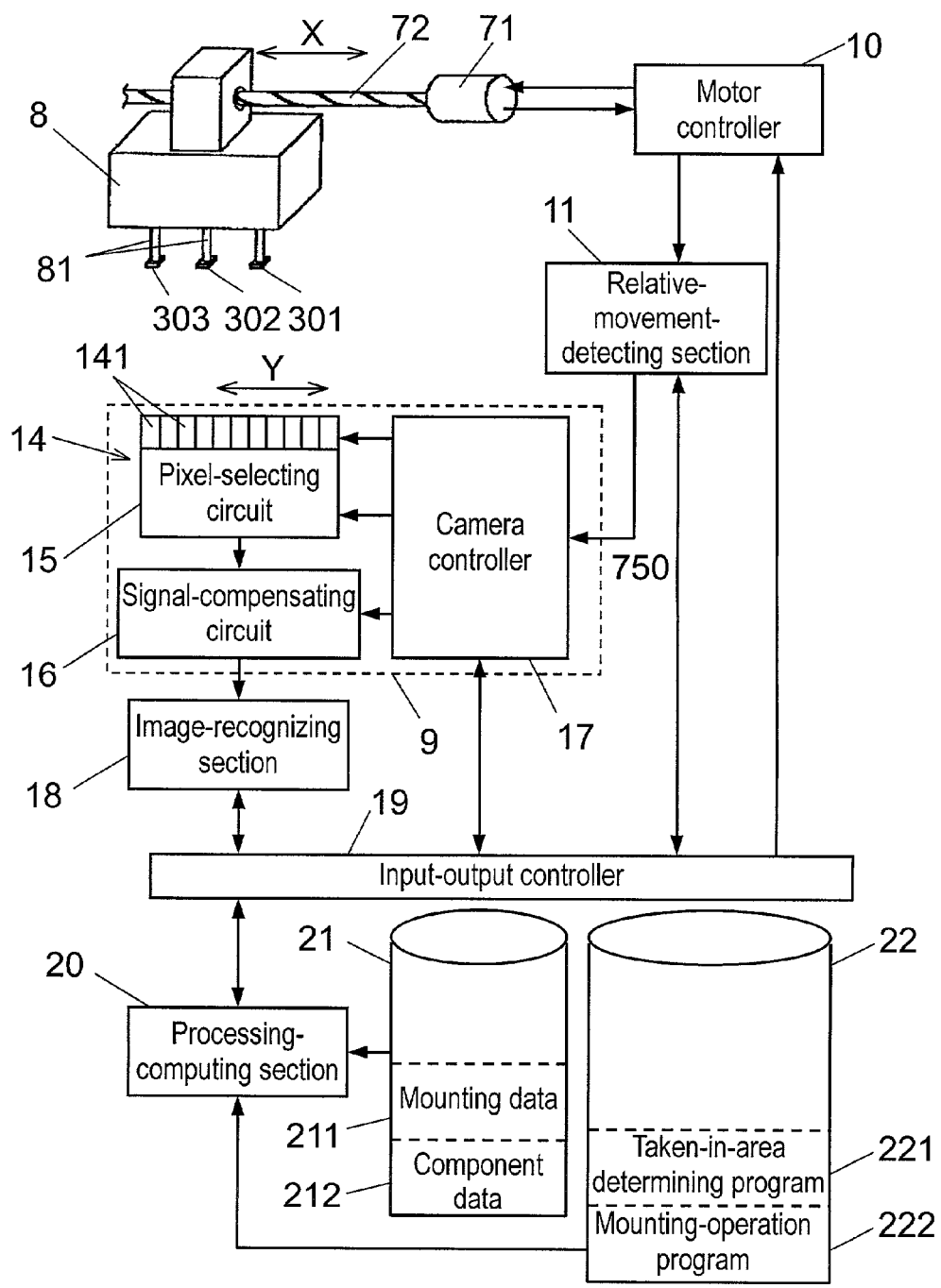
FIG. 2 is a block diagram of the image reading device in accordance with the embodiment of the invention.
Figure 3:
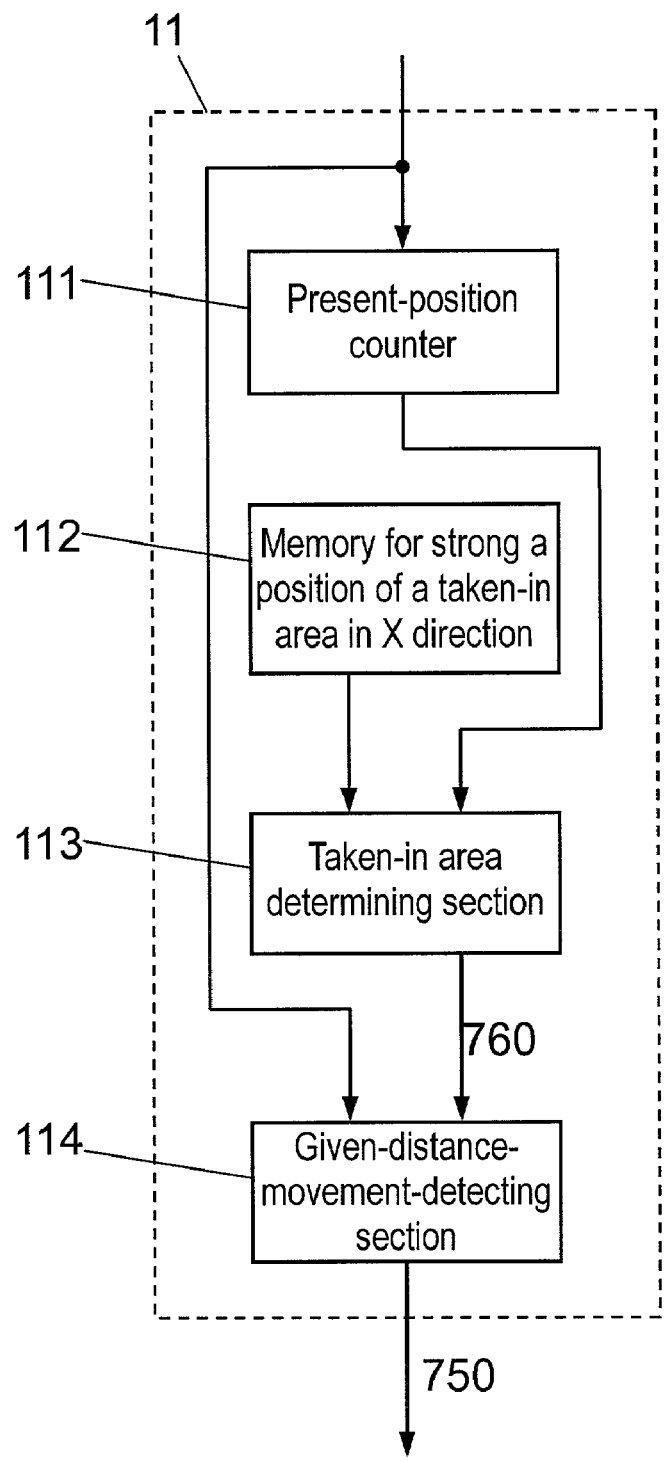
FIG. 3 is a block diagram of a relative-movement-detecting section of the image reading device shown in FIG. 2.
Figure 4:
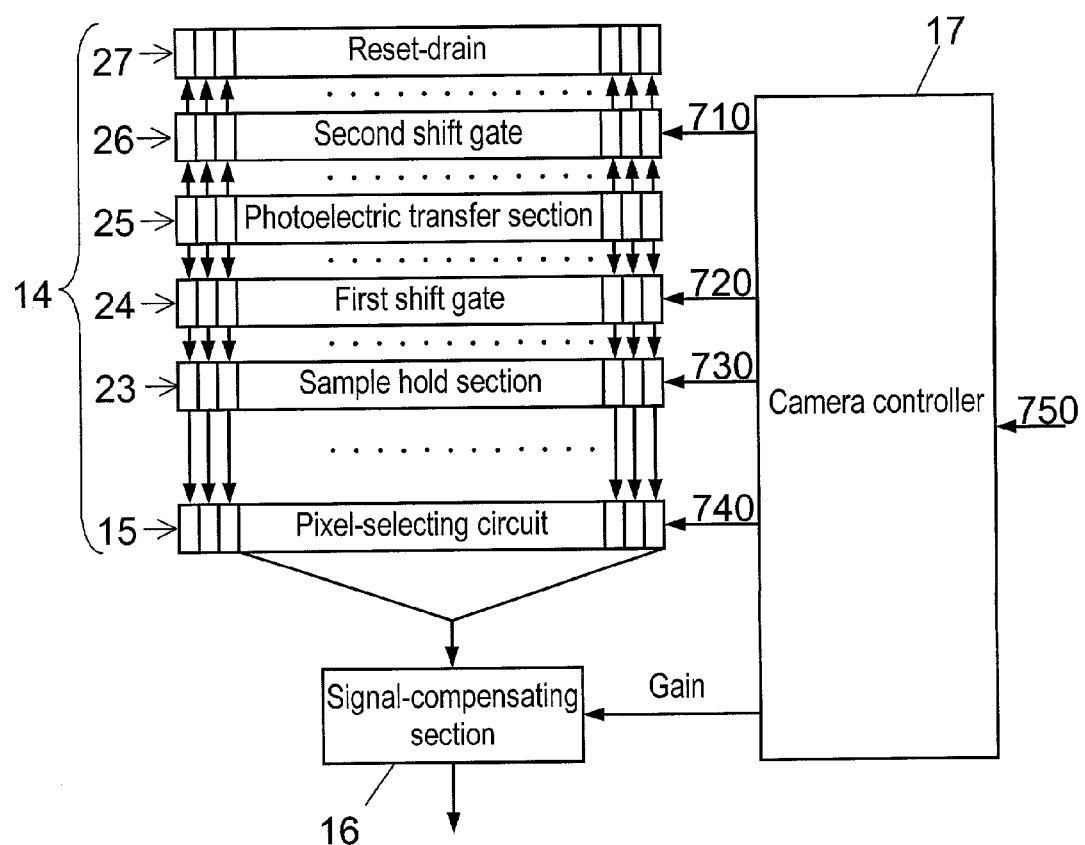
FIG. 4 shows a structure of a line sensor of the image reading device shown in FIG. 2.
Figure 5:
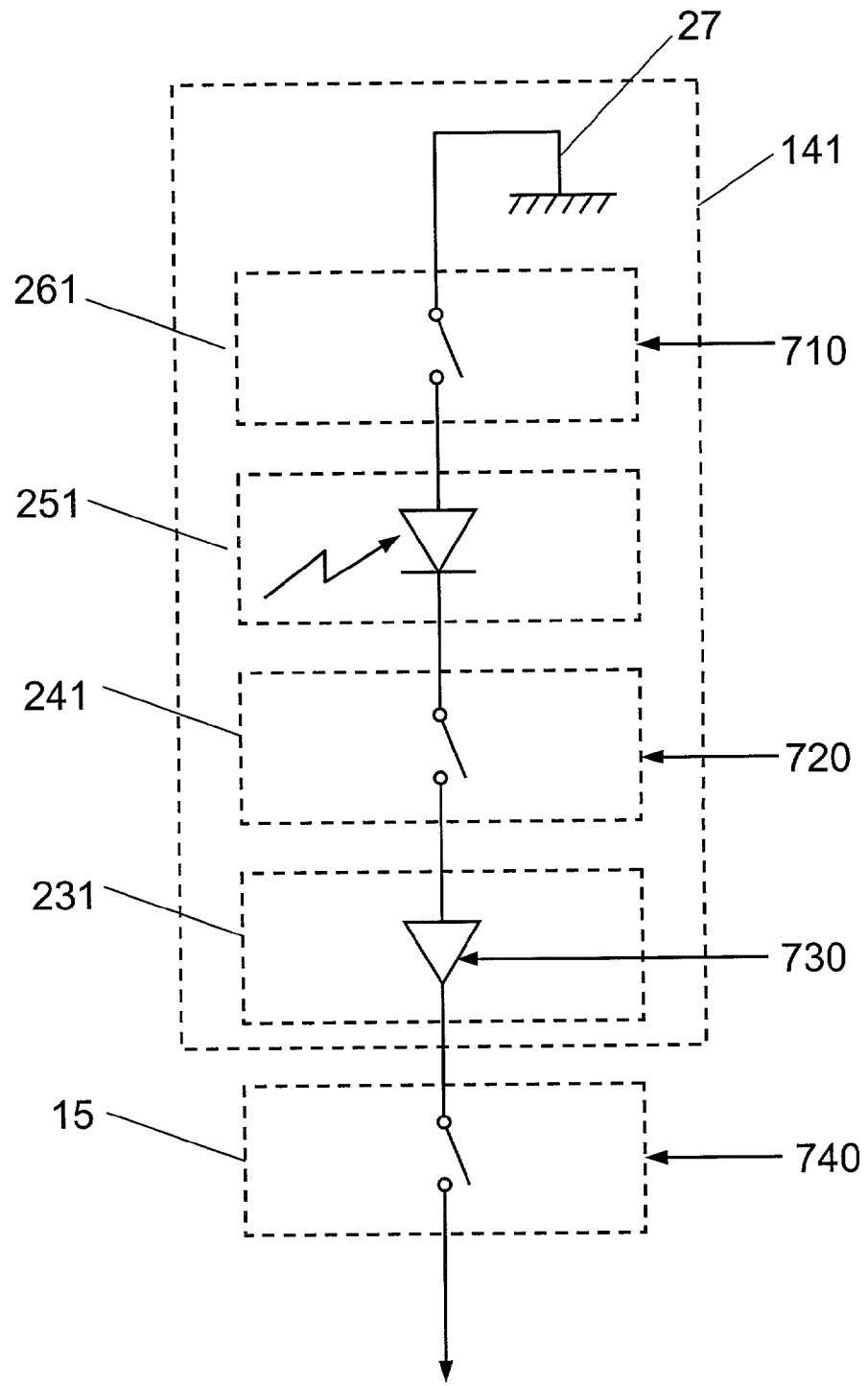
FIG. 5 shows one of pixels forming the line sensor of the image reading device in FIG. 2.
Figure 6:
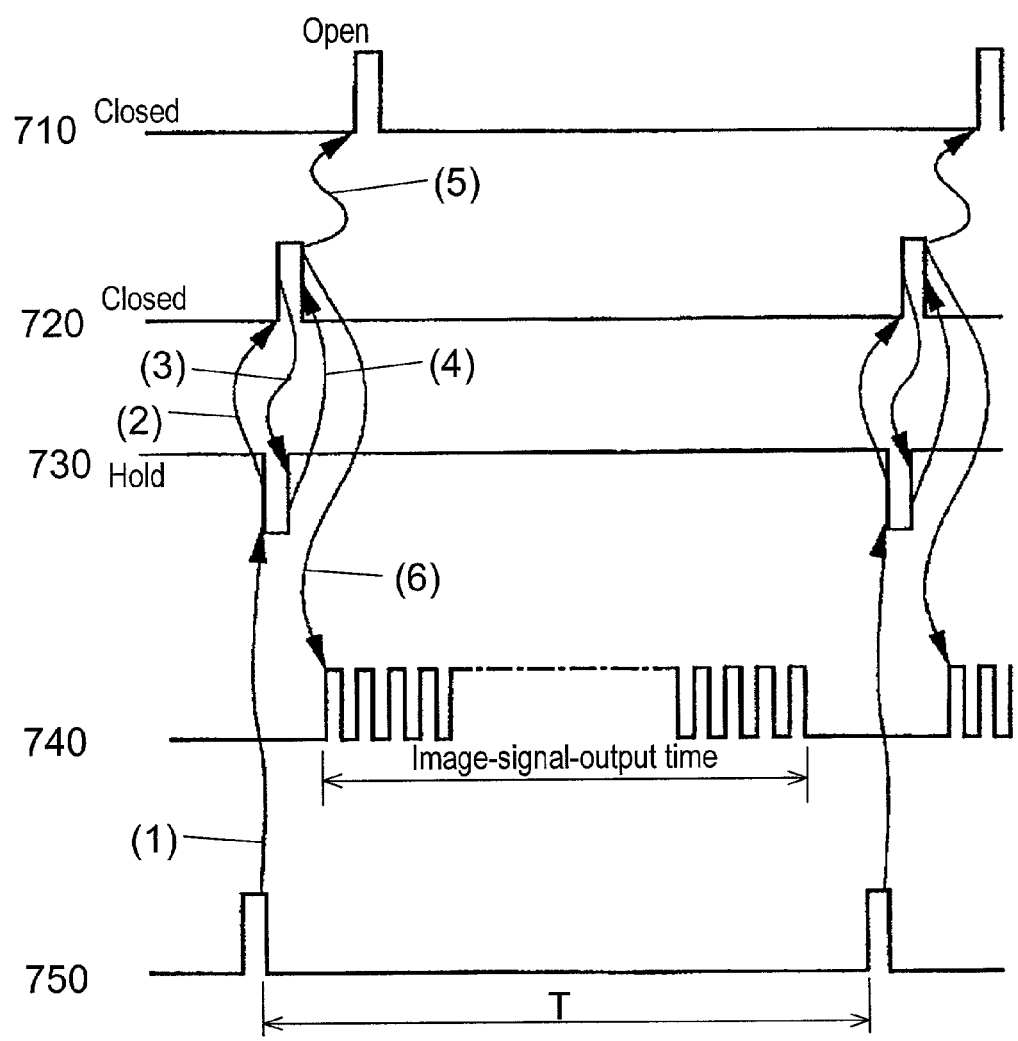
FIG. 6 is a timing chart explaining the function of the line sensor of the image reading device in FIG. 2.

A structure of an electronic-component-mounting apparatus incorporating an image reading device and a structure of the image reading device are described. FIG. 1 is a perspective view of a component-mounting apparatus with the image reading device in accordance with the embodiment of the invention. FIG. 2 is a block diagram of the image reading device in accordance with the embodiment of the invention. FIG. 3 is a block diagram of a relative-movement-detecting section of the image reading device. FIG. 4 shows a structure of a line sensor of the image reading device. FIG. 5 shows one of pixels forming the line sensor of the image reading device in FIG. 2. FIG. 6 is a timing chart explaining the function of the line sensor of the image reading device.

As shown in FIG. 1, transfer paths are disposed in X direction of a center of base 1. Transfer paths 2 transfer and position substrate 3. Component-supplying sections 4 are disposed on both sides of transfer path 2. Number of tape feeders 5 are set at each component-supplying section 4 in parallel. Tape feeders 5 store components held on tapes and supply the components at pick-up positions by pitch-feeding.

Two Y axis tables 61, 62 are set in parallel at both the edges of the upper face of base 1. X axis table 7 with transfer head 8 is set on both Y axis tables 61, 62. Head 8 has absorbing nozzles 81, which absorb a plurality of components, at its bottom part (shown in FIG. 2). Since Y axis tables 61, 62 and X axis table 7 are movable, head 8 moves horizontally and picks up components from pick up positions of tape feeders 5.

Camera 9 for reading images of components is disposed under a moving route of head 8 between transfer path 2 and supplying section 4. Camera 9 comprises a line sensor formed of pixels having photoelectric transfer elements. The pixels are arrayed in Y direction in series.

An image reading device in accordance with the embodiment of the invention is described hereinafter with reference to FIG. 2. As shown in FIG. 2, components 301, 302 and 303 held by absorbing nozzles 81 of transfer head 8 move above camera 9 sequentially, then components 301, 302 and 303 are illuminated from below with a light (not shown). Optical images of the components are formed on the pixels. Image signals which are converted from the optical images to electrical signals are output.

In FIG. 2, motor 71—a driving motor of X axis table 7—is controlled by motor controller 10. In other words, controller 10 controls motor 71 based on a speed command and a position command transmitted via input-output controller 19. Motor 71 rotates feed screw 72, whereby head 8 moves in a given pattern in X direction relative to camera 9.

Camera 9 takes pictures while head 8 is moving, so that camera 9 obtains scanning images of components 301, 302 and 303. X axis table 7 has a moving-mechanism relative to Y direction (a pixel-arranged direction of line sensor of camera 9). X axis table 7 moves components 301, 302 and 303 (objets to be shot by camera 9) in X direction crossing Y direction at right angles. Scanning images obtained are recognized as pictures, whereby components 301, 302 and 303 are identified and the positions are detected. The components are mounted on substrate 3 after misregistrations are corrected based on the result of detecting positions.

Motor 71 has an encoder (not shown). Pulse signals from the encoder are sent to motor controller 10. Controller 10 detects a position of head 8 by the pulse signals, and transmits the signals as the present position of head 8 to input-output controller 19. Relative-movement-detecting section 11 receives the pulse signals from the encoder via controller 10. Detecting section 11 detects that components 301, 302 and 303 move a given distance in X direction relative to camera 9. Detecting section 11 outputs movement-detecting signal 750 to camera-controller 17.

Relative-movement-detecting section 11 is described hereinafter with reference to FIG. 3. As shown in FIG. 3, detecting section 11 has present-position counter 111, memory 112 for storing a position of a taken-in area in X direction, taken-in area determining section 113, and given-distance-movement-detecting section 114. Counter 111 counts pulse signals supplied from the encoder of X axis motor 71 and detects the present position of head 8 in X direction, where the pulse signals are sent via controller 10. The present position detected is sent to taken-in area determining section 113.

Memory 112 stores positional information in X direction of an image-taken-in area as mechanical coordinates of a relative-moving mechanism, where the image-taken-in area has been set by camera 9. Memory 112 also stores data of given distances corresponding to scanning spaces as mechanical coordinates of the relative-moving mechanism. The data are sent to memory 112 via input-output controller 19.

Taken-in area determining section 113 compares the present position sent from counter 111 with positional information in X direction sent from memory 112. Determining section 113 then determines a relative-position relation between camera 9 and head 8. The determining section 113 outputs allowing-signal 760 which allows given-distance-movement-detecting section 114 to operate when the determining section 113 determines the components are inside the image-taken-in area.

Detecting section 114 detects whether or not head 8 moves the given distance relative to camera 9. Detecting section 114 counts the pulse signals supplied from the encoder and monitors the movement of head 8 relative to camera 9 when detecting section 114 is allowed to operate by supplied signal 760. Detecting section 114 outputs movement-detecting signal 750 and resets the count number of the pulse signals when head 8 moves the given distance corresponding to the scanning space which have been set. Detecting section 114 repeats the same operations and outputs signal 750 to camera-controller 17 when signal 760 is output. The line sensor obtains the object images based on a control command of controller 17 using signal 750 as a trigger.

The scanning space—the given distance discussed above—is a parameter for specifying resolution of the pictures obtained by camera 9. A fine image is obtained when the scanning space is narrow. The image becomes coarse when the scanning space is widened. In this embodiment, since the scanning space can be set responsive to each image-taken-in area, desirable resolutions of images can be obtained corresponding to the kinds, shapes, sizes and recognition-grade (grade of fine resolution) of components.

As shown in FIG. 2, camera 9 comprises line sensor 14, pixel-selecting circuit 15, signal-compensating section 16 and camera-controller 17. Line sensor 14 comprises a plurality of pixels 141 arrayed in Y direction in series. As shown in FIG. 4, line sensor 14 includes sample-hold section 23, first shift gate 24, photoelectric transfer section 25, second shift gate 26 and reset-drain 27. One of plural pixels 141 forming line sensor 14 is illustrated in FIG. 5. Pixel 141 is formed of photoelectric transfer element 251 of photoelectric transfer section 25, gate element 241 of first shift gate 24, gate element 261 of second shift gate 26 and storage element 231 of sample hold section 23. Each storage element 231 is coupled to pixel-selecting circuit 15.

Optical images are formed on line sensor 14, whereby photoelectric transfer element 251 receives light and stores electric charges. Control signal 720 is transmitted from camera-controller 17 to first shift gate 24, so that the electric charges of photoelectric transfer element 251 are sent to storage element 231 via gate element 241. Supplied electric charges are stored in storage element 231 as a voltage value corresponding to the amount of the electric charges. Control signal 730 is transmitted to sample-hold section 23 before new electric charges are supplied, so that the voltage value stored in storage element 231 is reset. Control signal 710 is transmitted to second shift gate 26, whereby electric charges of photoelectric transfer element 251 are supplied to reset-drain 27 via gate element 261. As a result, electric potential of each photoelectric transfer element 251 is initialized.

Pixel-selecting circuit 15 selects one of plural pixels 141 of line sensor 14 and outputs image signals from selected pixel 141. In other words, pixel-selecting circuit 15 outputs the voltage value stored as image signals from storage element 231, where the voltage value stored is selected from one of plural pixels 141 based on pixel-selecting information. Pixel-selecting circuit 15 accesses a plurality of pixels 141 individually and outputs image signals. Pixel-selection is operated by controlling pixel-selecting circuit 15 based on control signal 740 from camera-controller 17.

Image signals from the selected pixel by the pixel-selection are supplied using movement-detecting signal 750 as a trigger supplied from relative-movement-detecting section 11. Camera-controller 17 controls a pixel-selecting section (pixel-selecting circuit 15) based on pixel information when detecting section 11 detects that head 8 moves the given distance relative to camera 9. As a result, camera-controller 17 outputs image signals from a desirable pixel.

A function of line sensor 14 is described hereinafter with reference to FIG. 6. FIG. 6 shows working condition of elements forming line sensor 14, such as second shift gate 26, photoelectric transfer section 25, first shift gate 24 and pixel-selecting circuit 15. The working condition is related to movement-detecting signal 750 supplied from relative-movement-detecting section 11 and shown in the timing chart. FIG. 6 shows control signals 710, 720, 730 and 740 the same as shown in FIG. 4. In FIG. 6, step signals of control signals 710 and 720 show the open-state timings of second shift gate 26 and first shift gate 24 respectively. Control signal 730 shows the timings of holding and releasing voltage value of sample-hold section 23.

Control signal 740 shows the timing when image signals are output sequentially from storage element 231. A period from the first step signal to the last step signal shows image-signal-output time, i.e., necessary time for outputting image signals from all the selected pixels. A step signal of movement-detecting signal 750 shows an output timing from relative-movement-detecting section 11.

A hold-release signal is output on control signal 730 when movement-detecting signal 750 is supplied from relative-movement-detecting section 11 (arrow-mark 1), whereby a holding state of sample-hold section 23 is released. An open signal is output on control signal 720, then first shift gate 24 becomes an open state (arrow-mark 2). As a result, electric charges of photoelectric transfer section 25 are sent to sample-hold section 23. A hold signal is output on control signal 730, and sample-hold section 23 restores to the holding state again (arrow-mark 3). Transmitted electric charges are stored as a voltage value in sample-hold section 23.

A closing signal is output on control signal 720 and first shift gate 24 becomes a closed state again when sample-hold section 23 becomes a holding state (arrow-mark 4). A closing signal is output on control signal 710, whereby second shift gate 26 becomes an open state (arrow-mark 5). An electric charge state of photoelectric transfer section 25 is reset. Photoelectric transfer section 25 restarts light exposure at the timing when second shift gate 26 becomes the closed state again. Pixel-selecting circuit 15 outputs the voltage value as an image signal sequentially, following control signal 740 supplied based on pixel-selecting information, in parallel with light exposure (arrow-mark 6), where the voltage value has been stored in storage element 231.

Interval T (a period from a signal to the next signal of movement-detecting signal 750) is not necessarily the given period. Dispersion of interval T occurs by a mechanical error, e.g., an error of feed screw 72. Movement-distance of head 8 relative to camera 9 is kept constant regardless of mechanical errors during interval T. Time margin is set between end of an image-signal-output and start of the next image-signal-output from sample-hold section 23 in order to reduce dispersion of interval T.

In FIG. 2, image signals are output from respective pixel 141 of line sensor 14 based on pixel selecting operation and sent to signal-compensating section 16. Compensating section 16 compensates image quality based on camera-set-up-value, e.g., gain, where the camera-set-up-value is supplied from camera-controller 17. Camera-controller 17 receives pixel-selecting information, i.e., necessary information for driving pixel-selecting circuit 15, from input-output controller 19 and controls pixel-selecting circuit 15 based on the pixel-selecting information. Controller 17 outputs image signals from pixel 141 selected by pixel-selecting information and outputs a signal indicating a completion of taking-in a picture.

Image signals compensated by compensating section 16 are supplied to image-recognizing section 18. When recognizing section 18 receives the taking-in-completion signal supplied from controller 17, recognizing section 18 recognizes the taken-in image signals according to recognition algorithm designated by an algorithm number included in components data.

Input-output controller 19 is linked with motor-controller 10, relative-movement-detecting section 11, camera-controller 17, image-recognizing section 18 and processing-computing section 20. Controller 19 thus controls inputs and outputs of signals. Processing-computing section 20 executes processing programs stored in program-memory 22 based on data stored in data-memory 21.

Mounting data 211 and component data 212 are stored in data-memory 21. Data 211 are data regarding mounting processes, e.g., mounting positions of components, sequence of mounting of the components and kinds of nozzles used for picking up the components. Data 212 are database of various data for the components. Data 212 include data of shapes and sizes of the components, algorithm numbers added to algorithm used for recognition of the components, recognition parameters and so on. Taken-in area determining program 221 and mounting-operation program 222 are stored in program-memory 22. Program 221 determines sizes of image-taken-in area and scanning spaces based on the sizes and the shapes of the components in the component data. Program 221 outputs the information (the sizes and the spaces) as numerical values indicating pixel-selecting information and positions in X direction.

Figure 7:
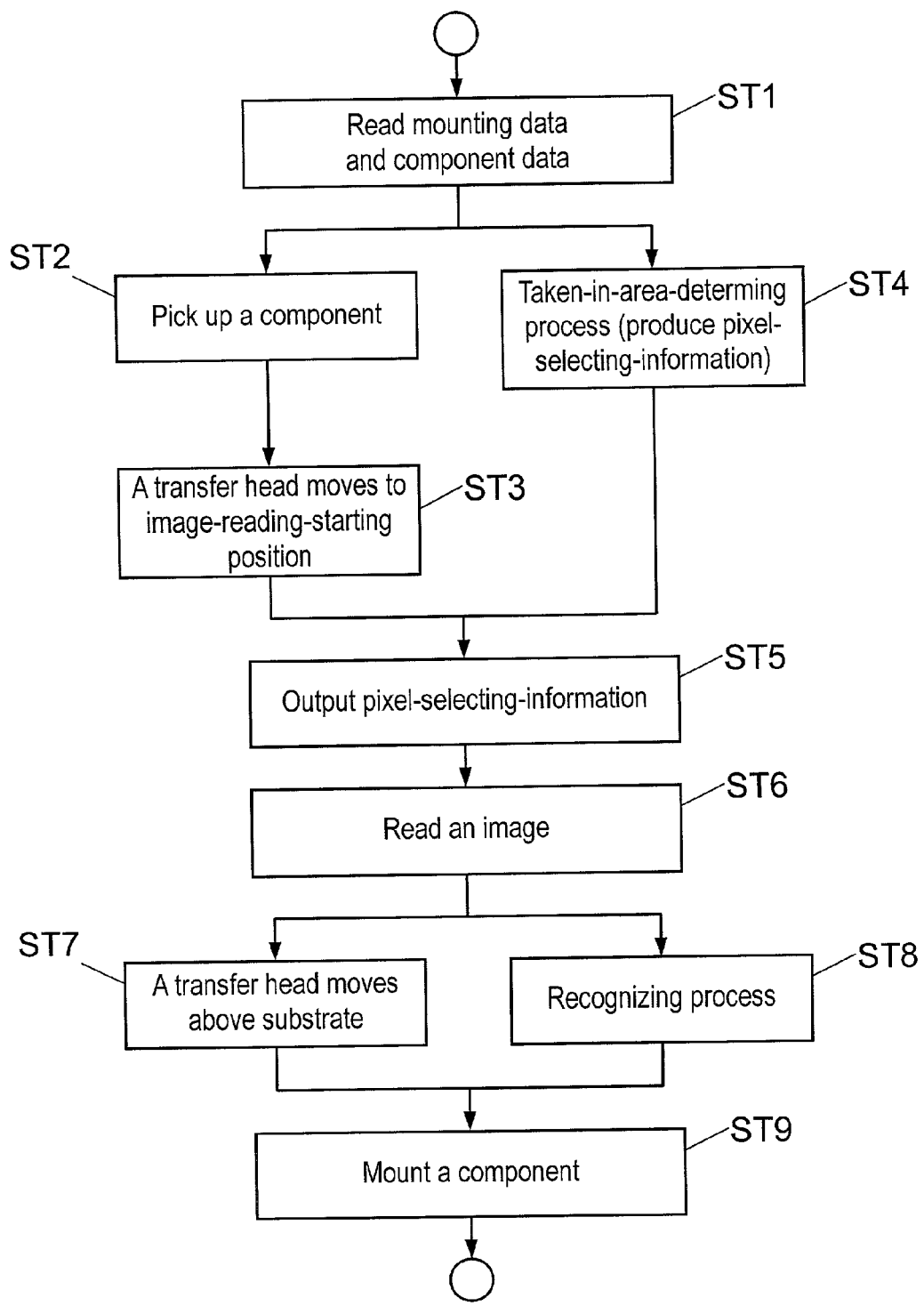
FIG. 7 is a flowchart illustrating a method of the image reading in accordance with the embodiment of the invention.
Figure 8:
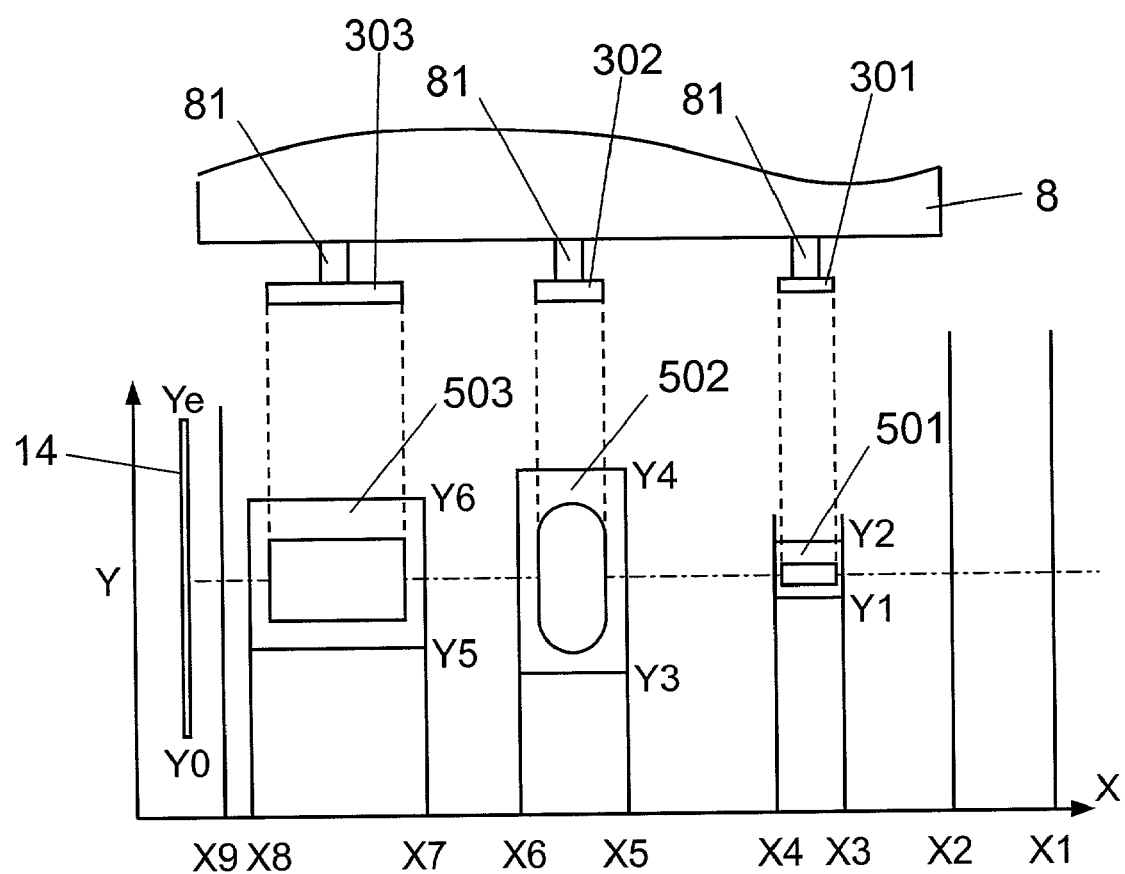
FIG. 8 is a schematic view of determining an image-taken-in area of the image reading method in accordance with the embodiment of the invention.

A method of mounting components according to this invention is described as follows. FIG. 7 is a flowchart illustrating a method of the image reading in accordance with this embodiment. FIG. 8 is a schematic view of determining an image-taken-in area of the image reading method in accordance with the embodiment of the invention.

Processing-computing section 20 reads mounting data 211 and component data 212 from data-memory 21 (ST1). Mounting operation is started and head 8 in FIG. 1 picks up the components from component-supplying section 4 (ST2). As shown in FIG. 8, three different kinds of components 301, 302 and 303 are picked up with absorbing nozzles 81. Head 8 moves to image-reading-starting position above camera 9 (ST3).

The following process is operated at the same time of operation of head 8. A taken-in area determining process is operated based on mounting data 211 and component data 212 (ST4). Program 221 is executed by processing-computing section 20, whereby image taken-in areas 501, 502 and 503 are determined corresponding to components 301, 302 and 303 which are held by head 8 as shown in FIG. 8.

In FIG. 8, numerical values (Y1, Y2 . . . Y6) in Y direction marked in respective image-taken-in areas are based on numerical values (Y0 . . . Ye) of arrayed pixels in line sensor 14. The numerical values (Y1, Y2 . . . Y6) show widths of image-taken-in areas (pixel areas selected as objects to be output and forming image signals) of reading images. When an image of image-taken-in area 501 corresponding to component 301 is read, an image signal from pixels between Y1 and Y2 out of a plurality of pixels 141 (Y0 . . . Ye) in line sensor 14 is output.

Numerical values (X1, X2 . . . X9) in X direction corresponding to respective image-taken-in areas show numerical values on mechanical coordinates of a relative-moving mechanism which moves head 8 in X direction. For example, the numerical values (X1, X2 . . . X9) correspond to pulse numbers supplied from the encoder of motor 71, where (X3, X4), (X5, X6) and (X7, X8) show respective start- and stop-timing of reading image-signals for image-taken-in areas 501, 502 and 503. Numerical values X1, X2 and X9 show timings of acceleration and deceleration at scanning operation of head 8.

In FIG. 8, numerical values on X axis in X direction correspond to a relative-position relation between line sensor 14 and head 8 in X direction. A positional relation between line sensor 14 and head 8 moving horizontally is determined by the numerical values. Agreement between positional information (a pulse signal) from the encoder of motor 71 and numerical value X1 means that head 8 reaches a given deceleration position to realize a given scanning speed. Numerical value X2 corresponds to a speed-determining position where head 8 finishes decelerating and moves at a given scanning speed.

Processing-computing section 20 monitors positional information supplied from the encoder of motor 71 via motor controller 10. When the positional information agrees with the numerical values discussed above, section 20 detects that the specific relative-position relations corresponding to respective numeral values are realized. Various operation controls, e.g., driving-control of head 8 and updating of pixels to be selected (from these pixels an image signal is output) in line sensor 14, are carried out responsive to the detected results.

Respective numerical values for image-taken-in areas 501, 502 and 503 in Y and X directions are determined based on shapes and sizes in the data of the components. The numerical values in Y direction show widths and sizes of image-taken-in areas. The numerical values in X direction show start- and stop-timing of image signals. Pixel-selecting-information which selects pixels (pixels from which an image signal is output) is produced based on the image-taken-in areas. Then the pixel-selecting-information is output (ST5), which allows camera 9 to be ready for reading images. Then images are read (ST6).

Processing-computing section 20, data-memory 21 and program-memory 22 form pixel-selecting-information-supplying means which supplies pixel-selecting-information including necessary information to specify pixels (pixels from which an image signal is output).

Images are read as follows. As shown in FIG. 8, in the case of the image-taken-in area 501 which is taken in first, the pixels between Y1 and Y2 out of a plurality of pixels 141 (Y0 . . . Ye) of line sensor 14 are selected to be output.

When positional information showing the position of head 8 agrees with X3, allowing-signal 760 is output from taken-in area determining section 113 of relative-movement-detecting section 11. Given-distance-movement-detecting section 114 outputs movement-detecting signal 750 to camera-controller 17, where signal 750 shows that head 8 moves a given distance (a scanning space) relative to camera 9.

Image signals from line sensor 14 are output using movement-detecting signal 750 as a trigger. The image signals are taken in image-recognizing section 18 via signal-compensating section 16. When head 8 moves and positional information agrees with X4, taken-in area determining section 113 stops outputting allowing-signal 760. An output of movement-detecting signal 750 is thus stopped and reading image by camera 9 is stopped. Head 8 moves further and images are read in the same manner repeatedly for image-taken-in areas 502 and 503. Different scanning spaces are determined for respective image-taken-in areas 502 and 503, so that images having resolutions corresponding to components 302 and 303 can be obtained.

When reading images for all components are finished, head 8 moves above substrate 3 (ST7). Recognizing process is operated at the same time (ST8). In other words, the image signals compensated at signal-compensating section 16 are supplied to image-recognizing section 18 and recognized. The components are mounted (ST9). To be more specific, misregistrations of components 301, 302 and 303 are corrected based on the recognition results by image-recognizing section 18. The components are mounted on substrate 3 by head 8. Components 301, 302 and 303 are recognized at proper resolutions corresponding to respective components, and yet, recognized based on a stable image free from dispersion of the resolution. As a result, accuracy of image recognition becomes stable and mounting accuracy can be improved.

In this embodiment, the image reading device is built in the component-mounting apparatus; however, this image reading device can be used in any apparatuses which read images, e.g., assembling apparatus and inspection machines.

According to the present invention, objects move in one direction relative to the camera by the relative-moving mechanism, and image signals from pixels are output by pixel-selecting-information repeatedly every time the objects move relative to the camera. As a result, dispersion of the resolution resulting from a mechanical error is reduced, and resolution becomes stable and an exact image is obtainable.

What is claim is:

1. An image reading device for reading an optical image of a plurality of components using a camera having pixels arrayed in a line, the image reading device comprising:
   (a) a pixel-selecting section for accessing the pixels individually and outputting an image signal;
   (b) a processing-computing section for 1) setting a plurality of image taken-in areas based on mounting data and component data, 2) outputting pixel-selecting information for selecting pixels individually from among the pixels, based on widths of the respective image-taken-in areas, and 3) setting respective start and stop timing of the image signal;
   (c) a relative-mounting mechanism for moving the plurality of components relative to the camera;
   (d) a relative-movement detector for 1) detecting the plurality of components moving a given distance in one direction relative to the camera by comparing position information from the relative-moving mechanism with each of the respective taken-in areas to determine whether each of the components is within the taken-in area and 2) providing a movement detecting signal; and (e) a controller for controlling said pixel-selecting section based on the pixel-selecting information and outputting a pixel signal supplied from the pixel specified by the pixel-selecting information when said relative-movement detector receives the movement detecting signal, wherein the widths of the image-taken-in areas corresponding to movement of the plurality of components, respectively, in the one direction relative to the camera, and the camera has a scanning width that accommodates the largest component.

2. The image reading device of claim 1, wherein the pixels form a line sensor having a sample-hold section, first and second shift, gates, a photoelectric transfer element, and a reset-drain.

3. An image reading method for reading an optical image of a plurality of components using a camera with pixels arrayed in a line, said method comprising the steps of:

(a) setting a plurality of image-taken-in areas based on mounting data and component data;

(b) generating pixel-selecting information based on widths of respective image-taken-in areas;

(c) setting respective start and stop timing of the image signal;

(d) moving the plurality of components by a relative-moving mechanism in one direction relative to a camera;

(e) determining whether each of the components is within the respective taken-in area by comparing position information from the relative moving mechanism with each of respective taken-in areas; and (f) outputting an image signal from a specified pixel repeatedly based on the pixel-selecting information when each of the components moves a giving distance relative to the camera when it is determined to be within the respective taken-in-area, wherein the widths of the image-taken-in areas correspond to movement of the plurality of components, respectively, in the one direction relative to the camera, and the camera includes a scanning width that accommodates the largest component.

* * * * *

UNITED STATES PATENT AND TRADEMARK OFFICE
CERTIFICATE OF CORRECTION

PATENT NO. : 7,030,924 B2
APPLICATION NO. : 10/036716
DATED : April 18, 2006
INVENTOR(S) : Takayuki Hatase and Masayuki Arase It is certified that error appears in the above-identified patent and that said Letters Patent is hereby corrected as shown below:

At Column 9, lines 6-7:

"corresponding" should read --correspond--.

At Column 9, line 14:

"second shift, gates" should read --second shift gates--.

At Column 10, line 12:

"giving distance" should read --given distance--.

Signed and Sealed this

Nineteenth Day of September, 2006

JON W. DUDAS
*Director of the United States Patent and Trademark Office*